United States Patent
Haeufgloeckner et al.

(10) Patent No.: US 9,839,972 B2
(45) Date of Patent: Dec. 12, 2017

(54) METHOD FOR MONITORING AND CONTROLLING A QUALITY OF SPOT WELDS

(71) Applicant: Robert Bosch GmbH, Stuttgart (DE)

(72) Inventors: Juergen Haeufgloeckner, Schneeberg (DE); Sebastian Zeller, Erbach (DE); Joachim Rathke, Buchen (DE)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 14/516,791

(22) Filed: Oct. 17, 2014

(65) Prior Publication Data

US 2015/0108100 A1 Apr. 23, 2015

(30) Foreign Application Priority Data

Oct. 21, 2013 (DE) .................. 10 2013 221 273

(51) Int. Cl.
| | |
|---|---|
| *B23K 9/28* | (2006.01) |
| *B23K 11/25* | (2006.01) |
| *B23K 11/11* | (2006.01) |
| *B23K 31/12* | (2006.01) |

(52) U.S. Cl.
CPC ............ *B23K 11/255* (2013.01); *B23K 11/11* (2013.01); *B23K 11/256* (2013.01); *B23K 11/257* (2013.01); *B23K 11/258* (2013.01); *B23K 31/125* (2013.01)

(58) Field of Classification Search
CPC ... B23K 11/255; B23K 11/256; B23K 11/257; B23K 11/258
USPC .. 219/86.1, 86.33, 86.41, 86.51, 86.61, 86.7
See application file for complete search history.

(56) References Cited

U.S. PATENT DOCUMENTS

| | | | | |
|---|---|---|---|---|
| 4,596,917 A | * | 6/1986 | Nied ................. | B23K 11/3009 |
| | | | | 219/109 |
| 6,278,077 B1 | * | 8/2001 | Cecil .................... | B23K 11/115 |
| | | | | 219/86.41 |
| 8,513,560 B2 | * | 8/2013 | Takahashi ............ | B23K 11/115 |
| | | | | 219/86.25 |

(Continued)

FOREIGN PATENT DOCUMENTS

| | | |
|---|---|---|
| DE | 43 30 914 A1 | 3/1995 |
| DE | 297 15 999 U1 | 4/1998 |

(Continued)

OTHER PUBLICATIONS

German Search Report corresponding to German Application No. 10 2013 221 273.9, dated Aug. 25, 2014; 10 pages.

*Primary Examiner* — Quang D Thanh
*Assistant Examiner* — Ayub Maye
(74) *Attorney, Agent, or Firm* — Maginot, Moore & Beck LLP (57) ABSTRACT

The disclosure concerns a method for monitoring and/or controlling a quality of spot weldings of a processing island, comprising at least two welding controls on one or more workpieces, wherein the method is based on a comparing of the measured values and an outputting of a fault message taking place from a central control of the processing island, the central control being in communicating connection with every welding control, in order to control them appropriately in dependence on all of the measured values and the predefined tolerance margin, the welding controls being in communicating connection with one another.

7 Claims, 3 Drawing Sheets

(56) References Cited

U.S. PATENT DOCUMENTS

| | | | | |
|---|---|---|---|---|
| 9,314,878 | B2* | 4/2016 | Abou-Nasr | B23K 31/125 |
| 2006/0169740 | A1* | 8/2006 | Fukuhara | B23K 20/125 |
| | | | | 228/2.1 |
| 2012/0118861 | A1* | 5/2012 | Haeufgloeckner | B23K 11/11 |
| | | | | 219/91.1 |
| 2013/0248505 | A1* | 9/2013 | Anayama | B23K 11/115 |
| | | | | 219/130.01 |

FOREIGN PATENT DOCUMENTS

| | | |
|---|---|---|
| DE | 103 28 635 A1 | 2/2005 |
| DE | 10 2009 016 798 A1 | 10/2010 |
| DE | 10 2010 052 717 A1 | 6/2011 |

* cited by examiner

Fig 1

|  | Process stability | UiP | FQF |
|---|---|---|---|
| Monitoring | On | On | Off |
| Reference |  | 100 | 100 |
| Absolute tolerance bands | Off | Off | Off |
| Permissible tolerance upwardly |  | 80,00 | 100,00 |
| Upper conditional tolerance band |  | 50,00 | 100,00 |
| Lower conditional tolerance band | 40,00 | 40,00 | 100,00 |
| Permissible tolerance band downwardly | 50,00 | 50,00 | 100,00 |

METHOD FOR MONITORING AND CONTROLLING A QUALITY OF SPOT WELDS

This application claims priority under 35 U.S.C. §119 to application no. DE 10 2013 221 273.9, filed on Oct. 21, 2013 in Germany, the disclosure of which is incorporated herein by reference in its entirety.

BACKGROUND AND SUMMARY

The present disclosure concerns a method and a device for monitoring and/or controlling a quality of spot welds of a processing island comprising at least two welding controls on one or more workpieces.

The present method thereby comprises firstly the step of measuring and storing measured values during or after the execution of resistance spot weldings at different locations on a workpiece, wherein the measured values represent a voltage, a current, a resistance, a welding time, an energy, a force on welding contacts, and/or a power during the production of a resistance spot weld.

In a next step, the measured values are compared with a reference measurement value and monitored, wherein the reference measurement value represents a corresponding voltage, a corresponding current, a resistance, a welding time, an energy, a force on welding contacts, and/or a power during the production of a corresponding resistance spot weld, wherein, in a next step, a fault message is output if it is established in the step of comparing and monitoring that a predetermined number of successive measured values lie outside a predefined tolerance margin from the reference measurement value and/or outside a tolerance zone.

Such methods of the generic type for monitoring and/or controlling a quality of spot welds are already well known from the prior art. As a specific example, in automated vehicle body manufacture the quality of the spot-welded connections must be continually checked and verified for reasons of product liability. In the case of the methods known from the prior art, one of the ways in which this is performed is for example by destructive testing of a body and/or by online quality monitoring, which are available to the adaptive welding systems.

Online quality monitorings which are carried out in accordance with the system standard PSQ 6000 by means of quality assessment factors or process assessment factors currently exist.

However, particularly in the case of online systems known from the prior art, it is only ever individual spot welds or welding programs that can be monitored. For this purpose, these already known systems produce monitoring factors that are provided with corresponding outer limits. If these limits are violated, a system stop is triggered, with a corresponding fault message, to which the plant operator can react.

It is therefore an object of the present disclosure to provide a method for monitoring and/or controlling a quality of spot welds of a processing island that is no longer subject to the aforementioned restriction with respect to individual spot welds or welding programs, and consequently to provide a method with which an overarching quality assessment of spot welds can be carried out.

In particular, by means of the methods described here for monitoring and/or controlling a quality of spot welds of a processing island, defective spot welds, wrongly parameterized combinations of metal sheets, defects in crash-relevant components and problems with specific welding guns or milling devices in production can be detected and eliminated much more quickly than the methods previously known from the prior art.

In order therefore to provide a method for monitoring and/or controlling a quality of spot welds of a processing island with which an overarching quality assessment as described above is made possible in a particularly simple, low-cost and reliable way, the present disclosure includes making use of the idea that the comparing of the measured values and the outputting of the fault message take place from a central control of the processing island, the central control being in communicating connection with every welding control, in order to control them appropriately in dependence on all of the measured values and the predefined tolerance margin, the welding controls being in communicating connection with one another. The welding controls are therefore interconnected and exchange over the network the monitoring results of the welded spots, so that all of the controls of a processing island have all of the quality assessments available to them. The evaluation of the overlaid quality specifications takes place at a central location within the controls involved, for example by way of the central server. In particular, the outputting of the fault message may be directly accompanied by a stop of the entire welding process within the processing island.

A sequence in which a quality assessment is carried out in the system after each welding sequence is conceivable. For this purpose, depending on the state of the plant, the quality factors UIP, FQF and PSF may be calculated, for example by way of a computer. At the same time, the stability of the production process may be determined by means of the factor PSF. For each spot weld, fault tolerances, corresponding to the quality specifications, are likewise defined. In the parameterization of the individual spot welds at the user interface, these are provided with a reference to the welding program, to a sheet thickness combination and to a welding gun. The identification of the vehicle body is communicated to the system by an external identification system by way of an input parameter field.

The welding quality UIP/FQF is obtained from the exact analysis of the resistance/force profile of a welding. Notable salient points and trends of the curve profile are used for the calculation. For this, the curve profile is divided into a number of segments. The initial value and the end value and also the local maximum and minimum count as notable points of the profile. Between these points, slopes and trends are derived, allowing a statement about the quality of the weld to be made. Depending on which segment is concerned, the results of the calculation of the individual segments are included in the UIP/FQF with different weightings. Since the dynamics of the curve profile are only poorly developed in the case of some welding tasks, a comparison with the corresponding segments of the reference profile is additionally produced and included in the calculation.

A quality factor (also known as a UIP/FQF value) may be a unitless variable calculated and normalized by the controller firmware. It describes the "theoretically calculated" quality of a spot weld, independently of whether this quality was achieved without or with a compensating control intervention.

High quality values in respect of UIP/FQF (i.e. in particular greater than 100) thereby predict on the basis of the calculation spot welds with a sufficient and good nugget diameter, which corresponds at least to the originally learned-in spot diameter.

Low quality values (with the minimum value being 0) predict an insufficient spot diameter or even an unattached spot weld (even inspite of control intervention). The calculation of the UIP value is based on an algorithm that is stored in the firmware of the controller. Input variables for the calculation of this value are measured and calculated electrical characteristics such as current, voltage, resistance, phase angle, power, and energy input, but also characteristics that describe the profile of the resistance curve measured at the time (minima, maxima, slopes), and consequently also the quality of the welding.

It is likewise possible to determine a process stability factor PSF, which shows the stability of the welding process and also makes possible or shows interventions of a corresponding controller. In conjunction with a process history that has been stored, a change of the process situation can be detected, whereby a trend analysis of the process is made possible. This involves ascertaining a comparison from a reference welding and a welding at the time.

A PSF value of 100 shows the exact match of the reference curve and the welding curve at the time. Any deviation of the two curves from one another reduces the stability factor.

In constant-current control/phase-angle control mode, the quality values and the stability factor are only calculated and displayed if a reference curve has been loaded.

For the determination of tolerance zones, for example formed as tolerance bands, for the monitoring of UIP/FQF and PSF, the following procedure is proposed:

Firstly, the actual values from the reference welding are taken over as a reference for the monitoring. An image of within which limits the monitored variable varies is obtained from the displayed profile of a monitored variable. The tolerances are best set around the reference value in such a way that most weldings lie in the "good region". Thus, outliers then lie outside the tolerance bands. It must be ensured that normal production variations do not lie outside the tolerance limits (for example those caused by slight electrode wearing, milling). In the display of the profile, the programmed tolerances are indicated as lines and graphically show how the tolerance bands would have an effect.

After possible further observation and optimization, the monitoring for this variable can be activated. In addition, it must be checked that the monitoring is also switched on for this program and "generally". The tolerances are programmed best in the following sequence at a user interface:

1. permissible tolerance band upwardly
2. conditionally permissible tolerance band
3. permissible tolerance band downwardly.

In addition, a quality factor may be determined by the ascertainment of a comparison of the resistance/force profiles in the welding at the time with the reference welding.

Consequently, a systematic fault detection is possible by the function presented, whereby a high standard of quality and production is ensured. In particular, a sustained quality of the spot welding process can be ensured in series production, whereby the production conditions significantly improve. At the same time, the enumeration of the measured values that have occurred outside a permissible tolerance range can be set in such a way that this counter is reset for each workpiece to be welded, so that a component- and/or processing-island-related quality warning message can be output. Alternatively, a production-program-related warning message output may also take place, in order to determine long-term wearing of the welding gun. It is possible by the proposed approach to ensure a monitoring function for a complete body shell of the quality of vehicle bodies.

Moreover, it is possible that the user limits or restricts the quality analysis to predetermined areas to be processed (welding gun (all spot welds that are welded with one gun), component (all spots that can be assigned to a component on the body, possibly different welding guns) and/or body (all spots on a vehicle body)).

Furthermore, the measured values of each resistance spot welding for each workpiece may also be stored in a central memory. This facilitates the demonstration of evidence when there is an objection to a defective workpiece, since in such an embodiment of the disclosure the quality of each spot welding can be exactly documented and called up from the central memory or computer.

It is also favorable if in the method according to a further embodiment of the disclosure a step of executing a reference measurement is also provided, the corresponding reference value being recorded and stored for the subsequent comparison with the measured values. This offers the advantage that a recording of the reference value for a resistance welding gun is individually possible, so that peculiarities of the resistance welding gun respectively used can be taken into account.

Such a central control as that described above, with assessment of all the welding parameters and parameters defined and caused by the welding controls with one another, allows a particularly simple quality assessment overarching the entire welding process to be carried out globally with reference to the welding process that is performed by the processing island. To this extent, a particularly simple quality overview of the entire welding process that is assigned to the processing island is made possible in a particularly simple way. In this connection, a "processing island" is a process method and/or a process device (for example welding production plant) that is assigned clearly, for example bijectively, to at least one welding process and/or at least one welding process chain. The welding controls may be such controls that comprise at least one welding program with respect to a number of spot welds which are welded with the same welding program, i.e. welding parameters.

In other words, the present disclosure is based inter alia on the finding that an improvement of the quality to be produced of a resistance spot welding can be achieved by certain physical variables being measured and compared with reference variables when applying the resistance spot welds. If the measured variables lie outside a tolerance range of for example 70% above or below the reference value, such a deviation is registered and the deviation is stored. If such a deviation from the reference value then occurs again in a subsequent resistance spot welding, or the measured value thereof, this deviation is in turn registered and stored. The measurement then following is again analogously compared with the reference value and stored. If it is then established when storing that there are a certain number of (successive) measured values that all lie outside the tolerance range around the reference value, the warning message is output. In this way it can be ensured that a warning is output when the resistance spot welds are of a quality that is too poor, and a measure to improve the quality of the spot welds is taken to ensure that the quality of further resistance spot weldings again lies in the tolerance range around a reference measurement value. A recording of the quality of each resistance spot weld can also be easily performed, so that complete documentation is available even in the case where damage has occurred.

Among the advantages offered by such an approach to checking and/or controlling the quality of a resistance spot welding is that, as a result of the automatic recording, it can be detected very quickly and exactly whether the corresponding resistance spot welding satisfies a predetermined quality criterion (which is represented by the reference measurement value). If this is not the case, the output warning message can initiate manual reworking of a resistance spot welding concerned, in order to satisfy the required quality criterion. By fixing the predetermined number of measured values (for example 3 to 5 measured values) that lie outside the predefined tolerance margin from the reference value and that have to be reached for the output of the warning message mentioned, it can be ensured that an individually occurring disturbance is not interpreted as wear-induced changes, for example of a resistance welding gun. This ensures that the output of the warning message only takes place in the actual event of wearing of the welding gun or a system-related change of the welding environment that tends to lead to weak spot welds, and should therefore be detected. Furthermore, the proposed approach offers the possibility in principle of storing for each resistance spot welding the recorded measured value for each workpiece, and consequently making a complete quality control of the resistance spot welding possible. This easily enables a user of the proposed approach to demonstrate when there is a claim for compensation for damage that there was no defect on a workpiece welded at the user's premises.

According to at least one embodiment, the method for monitoring and/or controlling a quality of spot welds of a processing island comprises at least two welding controls on one or more workpieces, the method comprising the steps whereby firstly measured values are measured and stored during or after the execution of resistance spot weldings at different locations on a workpiece, wherein the measured values represent a voltage, a current, a resistance, a welding time, an energy, a force on welding contacts, and/or a power during the production of a resistance spot weld. In a next step, the measured values are compared with a reference measurement value and monitored, wherein the reference measurement value represents a corresponding voltage, a current, a resistance, a welding time, an energy, a force on welding contacts, and/or a power during the production of a corresponding resistance spot weld, wherein, in a next step, a warning message is output if it is established in the step of comparing and monitoring that a predetermined number of successive measured values lie outside a predefined tolerance margin from the reference measurement value and/or outside a tolerance zone.

The comparing of the measured values and the outputting of the fault message take place here from a central control of the processing island, the central control being in communicating connection with every welding control, in order to control them appropriately in dependence on all of the measured values and the predefined tolerance margin, the welding controls being in communicating connection with one another.

According to at least one embodiment, the method also comprises a step of assessing the quality of a resistance spot of a spot welding, wherein a temporal resistance/force profile in respect of the resistance spot welding is compared with a temporal resistance/force profile in respect of a resistance reference spot welding for the assessment of the quality, and the quality of the resistance spot weld is based on an evaluation as to whether the temporal resistance/force profile of the resistance spot welding is located outside a tolerance range around the temporal resistance/force profile in respect of the resistance reference spot welding or whether a derivative of the temporal resistance/force profile of the resistance spot welding at a predefined point in time lies outside a tolerance zone around a derivative of the temporal resistance/force profile of the resistance reference spot welding at the predefined point in time, and wherein, in the outputting step, the method also outputs a warning message whenever it has been established in the step of assessing the quality of the resistance spot welding that successively executed resistance spot welds have a temporal resistance/force profile which at at least one point in time lies outside the tolerance range around the temporal resistance/force profile of the resistance reference spot welding at the corresponding point in time.

Such an embodiment of the present disclosure offers the advantage that not only an individual (point-based) measured value is used for assessing the quality of a resistance spot welding, but a (longer) temporal profile of the resistance or the force during the welding. Using the temporal resistance/force profile of a welding of a reference spot, it can be detected from this whether the welding of the spot weld of the measured value likewise meets the high quality requirements. In this way, the warning message can be output in particular whenever the risk of wearing can also be clearly detected from the time sequence of the resistance welding with the resistance welding gun.

According to at least one embodiment, all of the welding controls are interconnected by way of a communication network, monitoring results of the welded spots being output and/or exchanged over the communication network, all of the welding controls of the processing island having all of the quality assessments ascertained by the comparison and/or the monitoring available to them by calling them up from the central control and/or by exchanging information with one another. To this extent, particularly easy communication of the individual controls with one another and with the central controls described here is made possible. The central controls may be for example a separate welding control, a separate computer server and/or one of the welding controls itself, so that at least one of the welding controls is in this case then both a welding control itself and assumes the function of a central control, and is then referred to as the central control.

According to at least one embodiment of the method, during the measuring of individual spot welds, a fault message is output by the central control whenever at least two successively measured spot welds are outside the predetermined tolerance margin. To this extent, it is prevented particularly effectively that a welding proceeds from two successive defective spot welds. In other words, it is consequently made possible that a flawed defective spot weld sequence is not produced, but instead for example a complete termination of all welding activities can be or is undertaken already at a very early time after the detection of a second spot weld occurring directly on a first defective spot weld.

According to at least one embodiment, during the measuring of individual spot welds, a fault message is output by the central control whenever a prescribable number of measured values within a series of measured values lie outside a tolerance margin. Although this may mean that two or more measurement spots are defectively executed and these measurement spots may also follow directly one after the other, the absolute number, measured by the total number of spot welds, must not for example exceed a limit value. It is also conceivable that on the one hand a fault message is output whenever at least two successively measured spot welds are outside the predetermined tolerance range and at the same time a prescribable number of measured values within the series of measured values outside the tolerance margin must not be exceeded, so that such a synergetic quality control is obtained with respect to the sequential defect sequence and also the absolute number of defects.

According to at least one embodiment, during the measuring of individual spot welds of a combination of metal sheets to be connected to one another, a fault message is output by the central control whenever a prescribable percentage of the measured values is outside the predetermined tolerance margin. To this extent, it is ensured that the sheets to be connected always conform to the welding standards mentioned in a particularly reliable way, and consequently a solid connection between the individual sheets that is ensured over a period of time is also produced, without the connections breaking or becoming unstable prematurely and failing to comply with prescribable standards.

According to at least one embodiment, in the event that, during a prescribable welding and/or assessment interval, the measured values at a resistance welding gun are outside the predetermined tolerance margin and/or are the tolerance zone, a fault message is output and/or the machine switches itself off, in particular fully automatically, for maintenance purposes. In particular, it is conceivable that, when prescribable assessment intervals are exceeded, the machine switches itself off of its own accord, and consequently it is also technically ensured independently of a processor and operator of the machine that no further reject material is produced when there is an excessive deviation from the reference values.

The disclosure also relates to a device for monitoring and/or controlling a quality of spot welds of a processing island. In particular, the device described here is suitable for carrying out the method described here. This means that all of the features that are disclosed for the method described here are also disclosed for the device described here, and vice versa.

According to at least one embodiment, the device for monitoring and/or controlling a quality of spot welds of a processing island comprises at least two welding controls on one or more workpieces, the device being designed and intended for measuring and storing measured values during or after the execution of resistance spot weldings at different locations on a workpiece, wherein the measured values represent a voltage, a current, a resistance, a welding time, an energy, a force on welding contacts, and/or a power during the production of a resistance spot weld, and for comparing the measured values with a reference measurement value and monitoring them, wherein the reference measurement value represents a corresponding voltage, a current, a resistance, a welding time, an energy, a force on welding contacts, and/or a power during the production of a corresponding resistance spot weld.

A fault message is output here if it is established in the step of comparing and monitoring that a predetermined number of successive measured values lie outside a predefined tolerance margin from the reference measurement value and/or outside a tolerance zone, the comparing of the measured values and the outputting of the fault message taking place from a central control of the processing island, the central control being in communicating connection with every welding control, in order to control them appropriately in dependence on all of the measured values and the predefined tolerance margin, the welding controls being in communicating connection with one another.

The device described here for monitoring and/or controlling a quality of spot welds of a processing island has in this case the same advantages and refinements as in connection with the method described here.

BRIEF DESCRIPTION OF THE DRAWINGS

Exemplary embodiments of the disclosure are presented in the drawings and are explained in more detail in the description below.

In the drawings.

DETAILED DESCRIPTION

In the exemplary embodiment and the figures, component parts that are the same or have the same effect are respectively provided with the same designations. The elements represented here are not to be regarded as true to scale, but rather individual elements may be shown exaggerated for better understanding.

Figure 1:
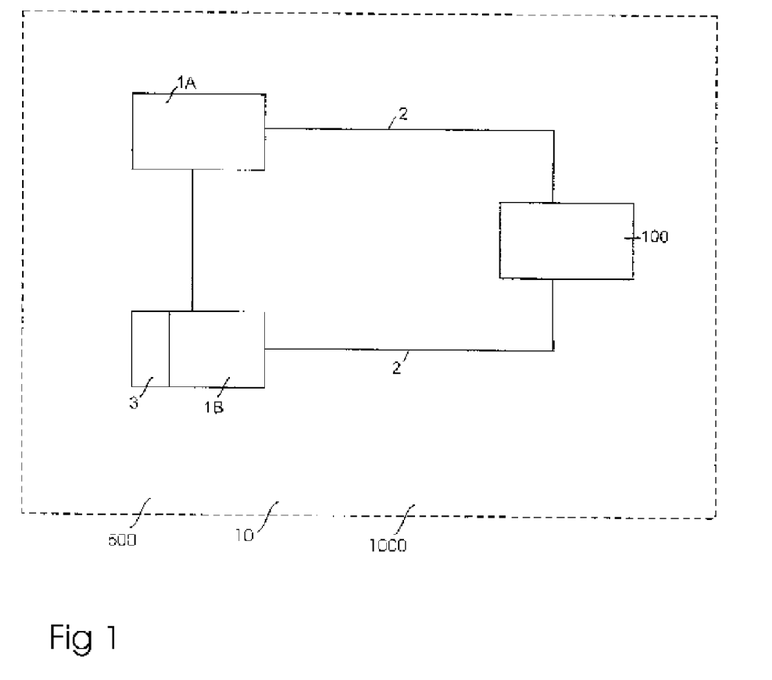
FIG. 1 shows a schematic exemplary embodiment of a device described here, with which an exemplary embodiment of the method described here can be carried out.

In FIG. 1A, a device 1000 for monitoring and/or controlling a quality of spot welds of a processing island is shown in a schematic plan view. In this case, the device 1000 comprises two welding controls 1A, 1B, which can carry out welding processes on a workpiece 100, and are therefore arranged in a process region within the processing island. In other words, the workpiece is located in a processing region of the processing island. In this case, a method 500 described here for monitoring and/or controlling a quality of spot welds of a processing island is carried out with the device 1000 described here, wherein, in a first step, measured values are measured and stored during or after the execution of resistance spot weldings at different locations on a workpiece, wherein the measured values represent a voltage, a current, a resistance, a welding time, an energy, a force on welding contacts, and/or a power during the production of a resistance spot weld.

Moreover, measured values are compared with a reference measurement value, wherein the reference measurement value 200 represents a corresponding voltage, a current, a resistance, a welding time, an energy, a force on welding contacts, and/or a power during the production of a corresponding resistance spot weld, and all of the welding controls 1A, 1B are interconnected by way of a communication network 2, monitoring results of the welded spots being output and/or exchanged over the communication network 2, all of the welding controls 1A, 1B of the processing island 10 having all of the quality assessments ascertained by the comparison and/or the monitoring available to them by calling them up from the central control 3 and/or by exchanging information with one another.

In a next step, a fault message is output whenever it is established in the step of comparing and monitoring that a predetermined number of successive measured values lie outside a predefined tolerance margin 200A, 200B from the reference measurement value 200 and/or outside a tolerance zone 300, the comparing of the measured values and the outputting of the fault message taking place from a central control 3 of the processing island 10, the central control 3 being in communicating connection with every welding control 1A and 1B, in order to control them appropriately in dependence on all of the measured values and the predefined tolerance margin 200A, 200B and/or a size of the tolerance zone 300, the welding controls 1A, 1B being in communicating connection with one another.

In particular, the quality assessment may be based, purely by way of example, on three automatically calculated monitoring factors, UIP, FQF and/or PSF. In this case, UIP and FQF characterize the welding quality (spot diameter) and the PSF reproduces the stability of the production process. The calculation of the three monitoring factors may take place by a comparison of a welding at the time with a previously stored reference welding. Various measurement curves (resistance, force, current) are thereby compared. The difference from UIP and FQF can be seen in particular in that in the case of UIP the resistance profile and in the case of FQF the force profile represents the basis for the evaluation. Whether UIP or FQF is used for the welding quality monitoring depends on the welding task.

Figure 2:
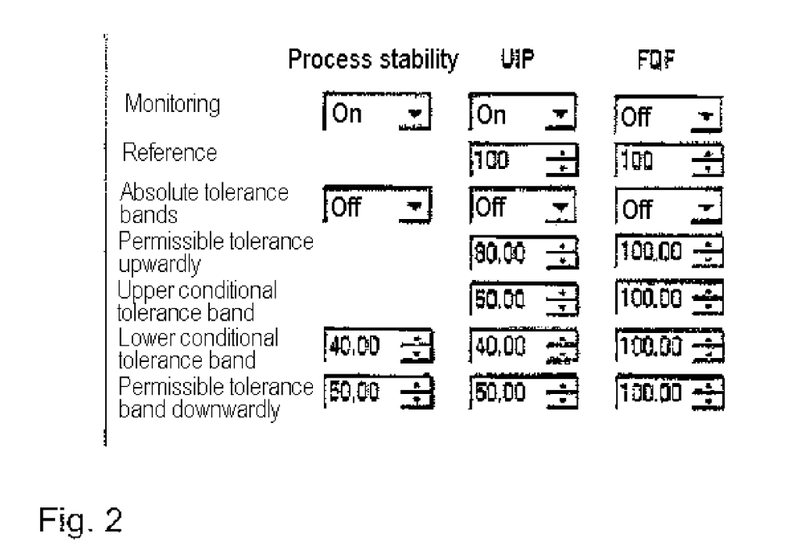
FIG. 2 shows a screenshot of an exemplary embodiment of a setting of the welding parameters described here.

Shown in FIG. 2 is an example of a screenshot that shows a parameterization of the quality factors UIP, FQF and PSF for an individual spot weld. The respective parameters can be taken here from the screenshots themselves and it should be pointed out that the present screenshot merely represents a representation of settings of the parameters that is given entirely by way of example, it being stated that it is conceivable that any desired combination of any desired parameters can be combined with one another.

Figure 3:
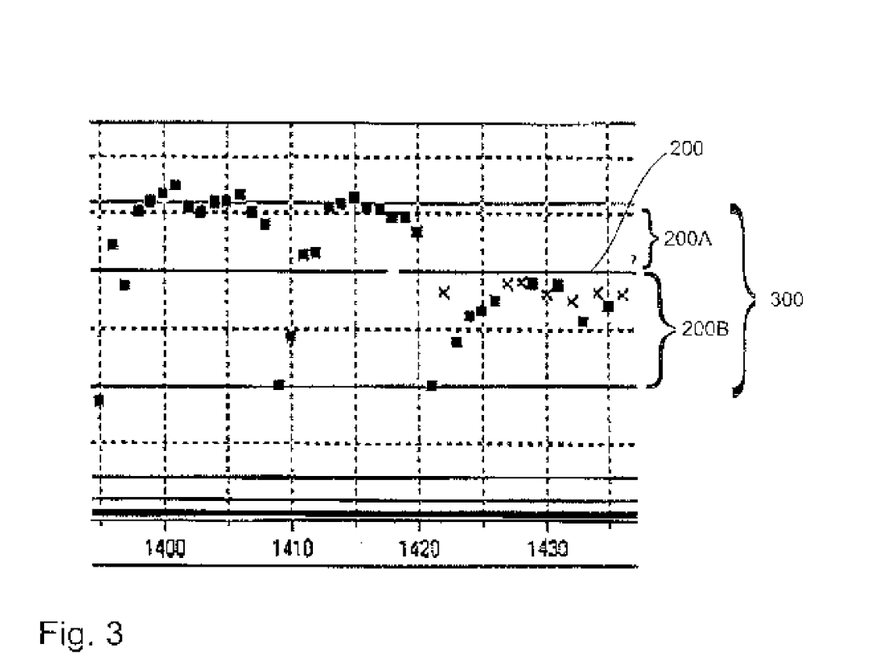
FIG. 3 shows a histogram of the quality factor UIP with tolerance limits over in the present case 40 spot welds.

Schematically shown in FIG. 3 is a histogram of the quality factor UIP with monitoring limits defined by the tolerance zone 300 and also the tolerance margins 200A, 200B over 40 spot welds. It is evident that in the diagram there is a tolerance margin 200A in the upward direction (toward greater values) and a further tolerance margin 200A is restricted in the downward direction (toward smaller values). Within the tolerance zone 300 there runs (in the horizontal direction, parallel to the welding time) the constant reference value, which is referred to as the reference measurement value 200. It is also evident that most of the forty measurement spots lie within the tolerance zone 300 between lines which are assigned to (temporally) constant tolerance margins 200A and 200B.

Figure 4:
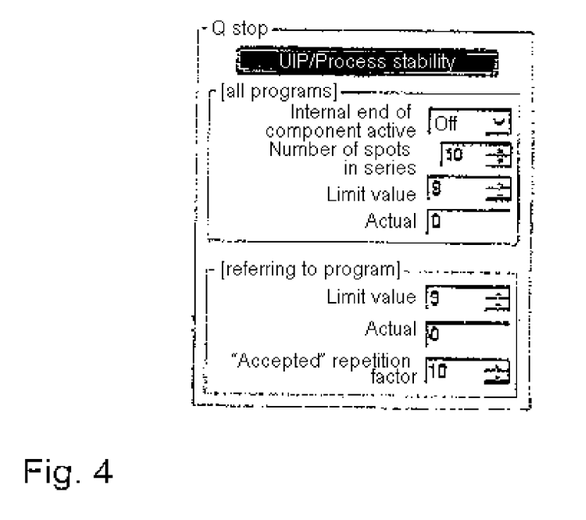
FIG. 4 shows an example of the parameterization of simple quality rules for the method described here.

Represented in FIG. 4 is an example of a parameterization of simple quality rules, such as for example the limiting number of spot welds that may follow one another outside the tolerance zone 300 without the welding process being interrupted.

Figure 5:
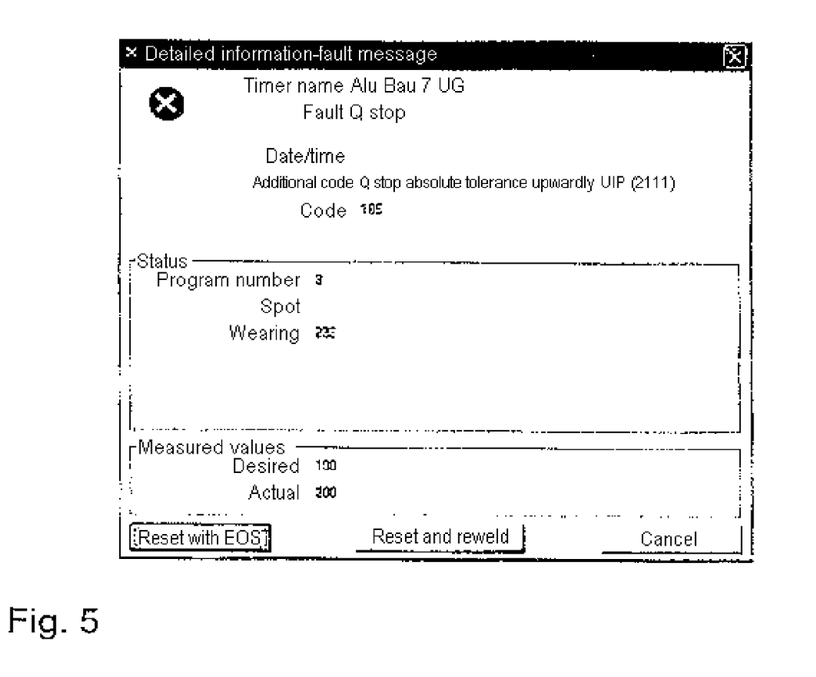
FIG. 5 shows a screenshot of an output system stop with a corresponding fault message.

Presented in FIG. 5 is a screenshot of a system stop given by way of example with a corresponding fault message, which is generated whenever for example, during the measuring, the number of measured values within a series of measured values outside the tolerance zone 300 exceeds a prescribable number.

The disclosure is not restricted by the description and the exemplary embodiment. Rather, the disclosure comprises every novel feature and every combination of features, which includes in particular every combination of features in the patent claims, even if this feature or this combination itself is not expressly shown in the patent claims or in the exemplary embodiment.

What is claimed is:

1. A method for at least one of monitoring and controlling a quality of spot weldings of a processing island having at least two welding controls on at least one workpiece, the method comprising:

measuring measured values one of during and after an execution of resistance spot weldings at different locations on the at least one workpiece, the measured values representing at least one of a voltage, a current, a resistance, a welding time, an energy, a force on welding contacts, and a power during a production of a resistance spot welding;

storing the measured values;

monitoring the measured values;

comparing the measured values with a reference measurement value, the reference measurement value representing at least one of a corresponding voltage, a current, a resistance, a welding time, an energy, a force on welding contacts, and a power during a production of a corresponding resistance spot welding; and outputting a fault message when a predetermined number of successive measured values lie at least one of outside a predefined tolerance margin from the reference measurement value and outside a tolerance zone, wherein the at least two welding controls are each configured to carry out different welding processes on the at least one workpiece, wherein the comparing of the measured values and the outputting of the fault message are performed by a central control of the processing island, wherein the central control is in communication with each of the at least two welding controls to control the at least two welding controls in response to the measured values and the predefined tolerance margin, wherein the at least two welding controls are in communication with one another, and wherein each of the welding processes perform a different spot welds on the at least one workpiece.

2. The method according to claim 1, further comprising: assessing a quality of the resistance spot welding, the assessing comprising: comparing a temporal resistance/force profile of the resistance spot welding with a temporal resistance/force profile of a resistance reference spot welding; and evaluating one of whether the temporal resistance/force profile of the resistance spot welding is located outside a tolerance range around the temporal resistance/force profile of the resistance reference spot welding, and whether a derivative of the temporal resistance-force profile of the resistance spot welding at a predefined point in time lies outside the tolerance zone around the derivative of the temporal resistance/force profile of the resistance reference spot welding at the predefined point in time, wherein the outputting further comprises: outputting a warning message when the temporal resistance/force profiles of successively executed resistance spot weldings at least one point in time lie outside the tolerance range around the temporal resistance/force profiles of the resistance reference spot welding at a corresponding point in time.

3. The method according to claim 1, wherein the at least two welding controls are interconnected by way of a communication network, the method further comprises at least one of:

outputting monitoring results of the resistance spot weldings over the communication network; and exchanging monitoring results of the resistance spot weldings over the communication network, and each of the at least two welding controls have results of at least one of the comparing and the monitoring available to them by at least one of calling the results up from the central control and exchanging information with one another.

4. The method according to claim 1, further comprising: outputting, during the measuring of the measured values of an individual resistance spot welding, the fault message from the central control when at least two successively measured resistance spot weldings are at least one of outside the predetermined tolerance margin and outside the tolerance zone.

5. The method according to claim 1, further comprising: outputting, during the measuring of the measured values of an individual resistance spot welding, the fault message from the central control when a predetermined number of the measured values within a series of the measured values at least one of lie outside the tolerance margin and lie outside the tolerance zone.

6. The method according to claim 1, further comprising: outputting, during the measuring of the measured values of an individual resistance spot welding of a combination of metal sheets to be connected to one another, the fault message from the central control when a predetermined percentage of the measured values is at least one of outside the predetermined tolerance margin and outside the tolerance zone.

7. The method according to claim 1, further comprising at least one of:

outputting, during at least one of a predetermined welding interval and predetermined assessment interval, the fault message when the measured values at a resistance welding gun are at least one of outside the predetermined tolerance margin and outside the tolerance zone, and switching the machine off for maintenance purposes, during at least one of the predetermined welding interval and the predetermined assessment interval, when the measured values at a resistance welding gun are at least one of outside the predetermined tolerance margin and outside the tolerance zone.

* * * * *